(12) United States Patent
Redline et al.

(10) Patent No.: US 11,566,088 B1
(45) Date of Patent: Jan. 31, 2023

(54) METHOD FOR ATTACHING NANOMATERIALS COMPRISING HEXAGONAL LATTICES TO POLYMER SURFACES

(71) Applicant: National Technology & Engineering Solutions of Sandia, LLC, Albuquerque, NM (US)

(72) Inventors: Erica Marie Redline, Albuquerque, NM (US); LaRico Juan Treadwell, Albuquerque, NM (US); Andrew Vackel, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 226 days.

(21) Appl. No.: 17/177,470

(22) Filed: Feb. 17, 2021

Related U.S. Application Data

(60) Provisional application No. 62/981,404, filed on Feb. 25, 2020.

(51) Int. Cl.
| | |
|---|---|
| C08F 8/32 | (2006.01) |
| C01B 32/174 | (2017.01) |
| C08F 8/14 | (2006.01) |
| C08F 10/02 | (2006.01) |
| C08G 59/14 | (2006.01) |
| C08G 64/42 | (2006.01) |

(52) U.S. Cl.
CPC .............. *C08F 8/32* (2013.01); *C01B 32/174* (2017.08); *C08F 8/14* (2013.01); *C08F 10/02* (2013.01); *C08G 59/1477* (2013.01); *C08G 59/1494* (2013.01); *C08G 64/42* (2013.01); *C01B 2202/02* (2013.01)

(58) Field of Classification Search
None
See application file for complete search history.

(56) References Cited

PUBLICATIONS

Yan et al., "Interface molecular engineering of single-walled carbon nanotube/epoxy composites," Journal of Materials Chemistry, vol. 22, pp. 1928-1936 (2012) (Year: 2012).*

Miskin et al., "Measuring and Manipulating the adhesion of Graphene," Nanoletters, vol. 18, pp. 449-454 (2018) (Year: 2018).*

Ajji et al., "Fabrication of polyaniline/poly(ethylene oxide)/non-covalently functionalized graphene nanofibers via electrospinning" Synthetic Metals vol. 200, pp. 7-13 (2015) (Year: 2015).*

(Continued)

*Primary Examiner* — Randy P Gulakowski
*Assistant Examiner* — Ha S Nguyen
(74) *Attorney, Agent, or Firm* — Kevin W. Bieg

(57) ABSTRACT

The invention is directed to a method for attaching nanomaterials containing hexagonal lattices to polymer surfaces. For example, carbon nanotubes (CNTs) can be attached to polycarbonate, polyethylene, or epoxy surfaces by amination of the polymer surface, functionalization of the surfaces of CNTs with ester groups, and reacting the aminated surface of the polymer with the ester groups of the functionalized surfaces of the CNTs in an organic solvent to chemically bind the CNTs to the polymer surface.

9 Claims, 8 Drawing Sheets

(56) References Cited

PUBLICATIONS

VanDelinder et al., "Simple, Benign, Aqueous-based Amination of Polycarbonate Surfaces," Applied Materials and Interfaces, vol. 7, pp. 5643-5649 (2015) (Year: 2015).*

Kuebler et al., "Low-Distortion Surface Functionalization of Polymeric Microstructures," Macromolecular Chemistry and Physics, vol. 215, pp. 1533-1542 (2014) (Year: 2014).*

Chen, R.J. et al., "Noncovalent Sidewall Functionalization of Single-Walled Carbon Nanotubes for Protein Immobilization," J. Am. Chem. Soc. 2001, 123, pp. 3838-3839.

Vandelinder, V. et al., "Simple, Benign, Aqueous-Based Amination of Polycarbonate Surfaces," ACS Appl. Mater. Interfaces 2015, 7, pp. 5643-5649.

* cited by examiner

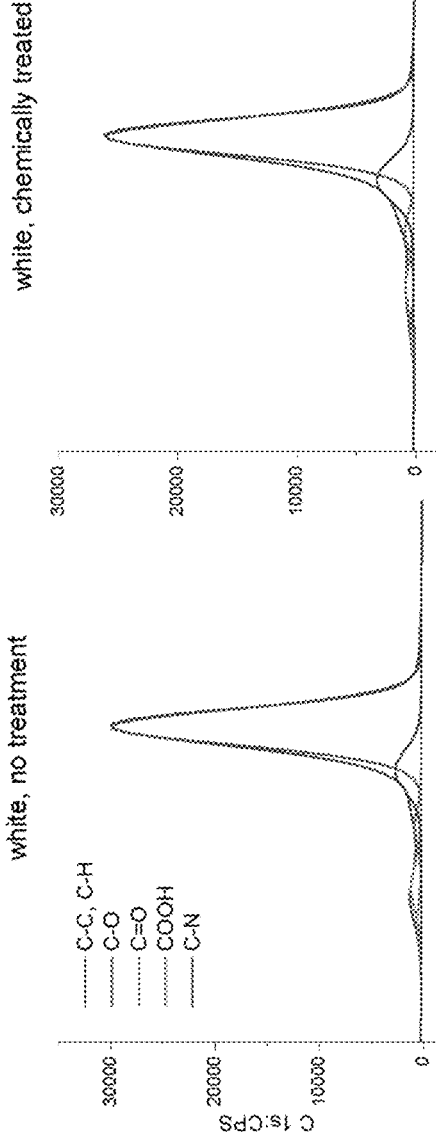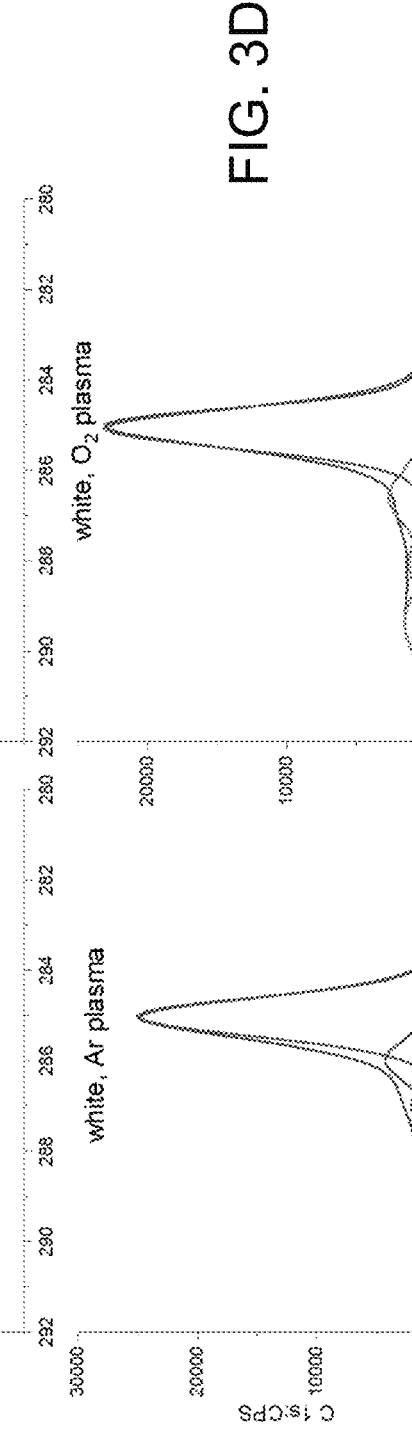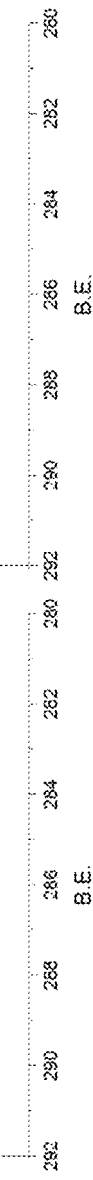
FIG. 3A  FIG. 3B  FIG. 3C  FIG. 3D

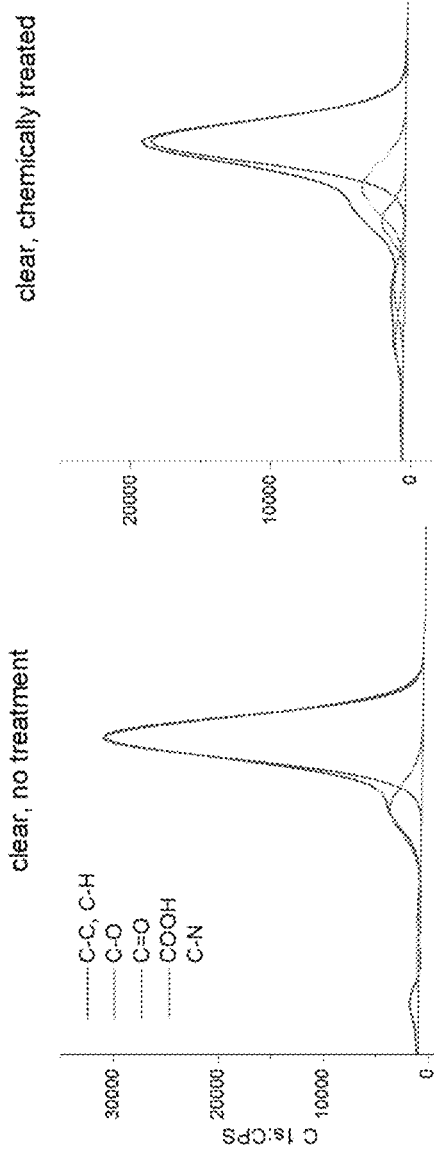
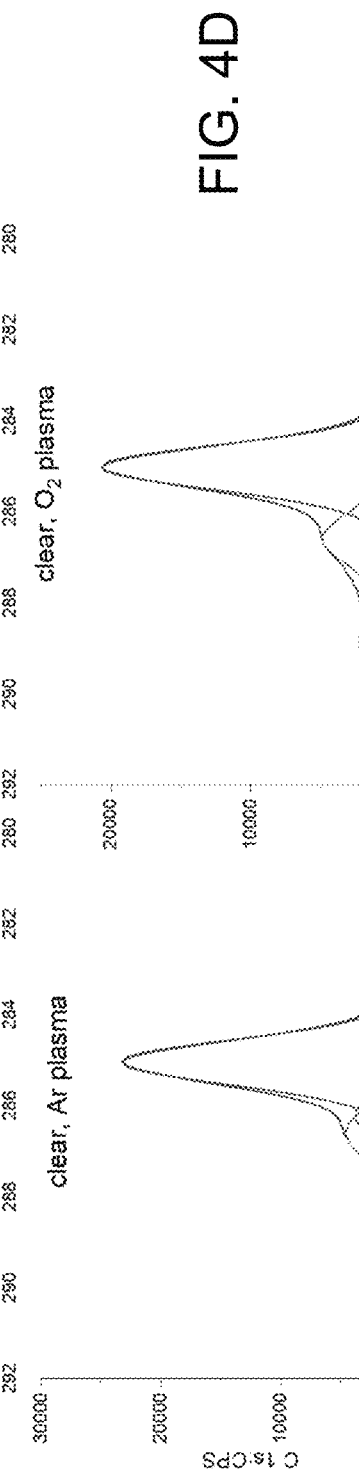
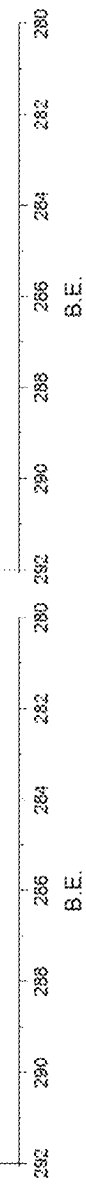
FIG. 4A  FIG. 4B  FIG. 4C  FIG. 4D

METHOD FOR ATTACHING NANOMATERIALS COMPRISING HEXAGONAL LATTICES TO POLYMER SURFACES

CROSS-REFERENCE TO RELATED APPLICATION

This application claims the benefit of U.S. Provisional Application No. 62/981,404, filed Feb. 25, 2020, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to nanomaterials and, in particular, to a method for attaching nanomaterials comprising hexagonal lattices to polymer surfaces.

SUMMARY OF THE INVENTION

The present invention is directed to a method for attaching carbon nanotubes (CNTs) or other hexagonal lattice-containing nanomaterials to a polymer surface, comprising aminating the polymer surface with amine groups, functionalizing the surfaces of the hexagonal lattice-containing nanomaterial with ester groups, and reacting the ester groups on the functionalized nanomaterial surfaces with the amine groups on the aminated polymer surface in an organic solution to form amide bonds, thereby attaching the nanomaterial to the polymer surface. Alternatively, the inverse of this chemistry can be used to react amine-functionalized nanomaterials with polymers or even one another to build up layers of the same or different materials, for example, CNTs attached to graphene attached to boron nitride.

As an example, the method can be used to pattern CNTs onto polymer surfaces for applications in electronics. It can also be used to create films of nanomaterials on polymer surfaces for transparent conducting films, OLEDs, etc. having increased mechanical robustness. Additionally, the chemistry can be applied to vertically aligned carbon nanotube arrays (VA-CNTAs), which can be end-functionalized using this same method. These VA-CNTAs are highly absorbing in the UV to visible light spectrum. However, VA-CNTAs have very poor adhesion and as such are fragile and highly susceptible to forces normal to the nanotube long axis. Attachment of carbon nanotubes to polymer surfaces can be used to create a thermal barrier for spray coatings. The coatings can be applied by layer-by-layer dipping process between amine-functionalized polymer surfaces and functionalized CNTs. Additionally, the nanotube surface functionalization can be applied to boron nitride nanotubes, enabling their attachment to polymer surfaces.

BRIEF DESCRIPTION OF THE DRAWINGS

The detailed description will refer to the following drawings, wherein like elements are referred to by like numbers.

FIGS. 3A-3D show X-ray photoelectron spectroscopy (XPS) data for white high-density polyethylene (HDPE-W) samples. FIG. 3A: untreated sample. FIG. 3B: aminated+PEGylated sample. FIG. 3C: Ar plasma-treated sample. FIG. 3D: $O_2$ plasma-treated sample.

FIGS. 4A-4D show XPS data for polycarbonate (PC) clear samples. FIG. 4A: untreated sample. FIG. 4B: laminated+PEGylated sample. FIG. 4C: Ar plasma-treated sample. FIG. 4D: $O_2$ plasma-treated sample.

DETAILED DESCRIPTION OF THE INVENTION

Figure 1:
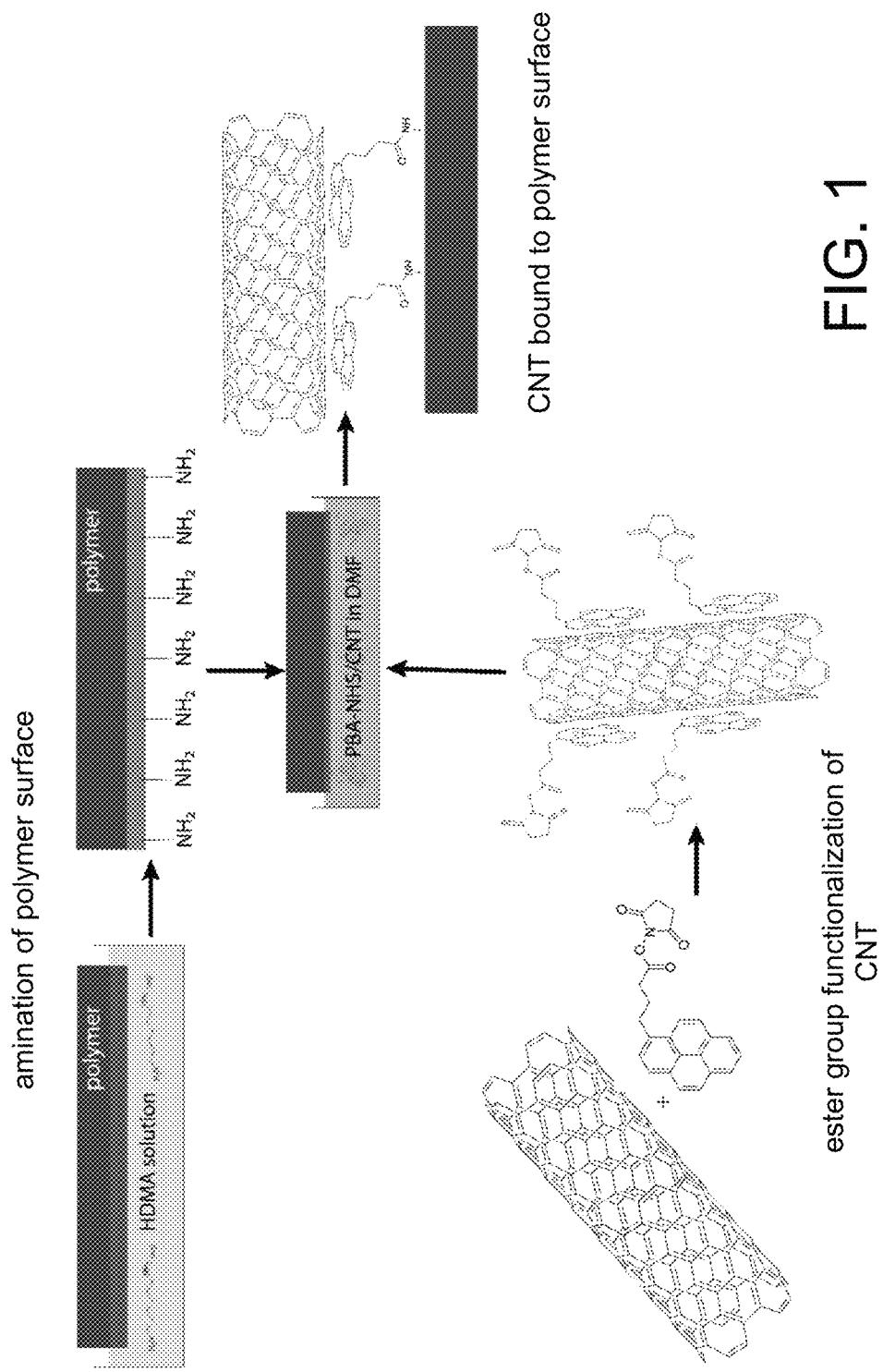
FIG. 1 is a schematic illustration of a method for attaching single-walled carbon nanotubes to polymer surfaces.

In FIG. 1 is shown an exemplary method for attaching carbon nanotubes (CNTs) to a polymer surface according to the present invention. The method comprises amination of a polymer surface, functionalization of the surfaces of CNTs with ester groups, and reacting the aminated surface of the polymer with the ester groups of the functionalized surfaces of the CNTs in an organic solvent to chemically bind the CNTs to the polymer surface.

Figure 2:
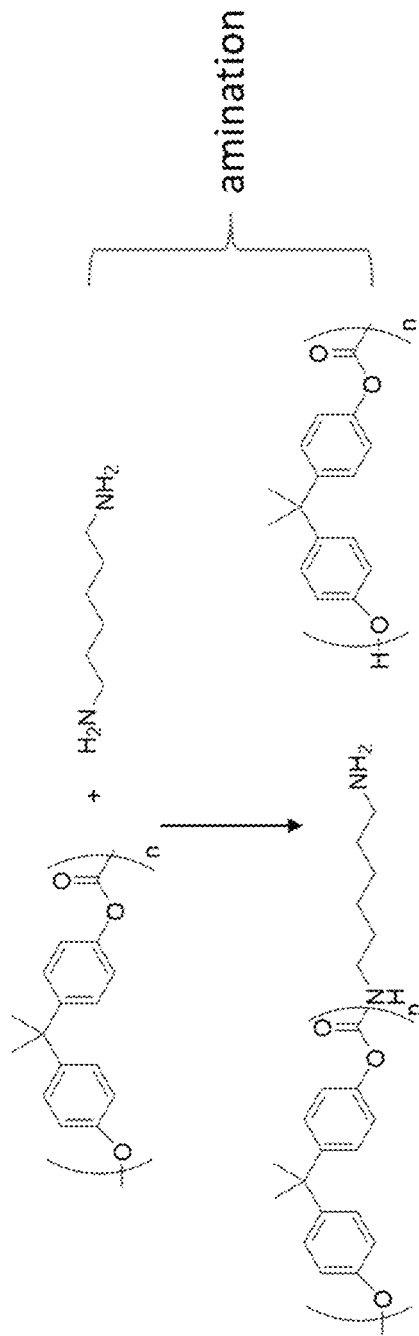
FIG. 2 is an illustration of the reaction mechanisms for polycarbonate amination.

The polymer surface can be aminated using the exemplary amination reaction chemistry shown in FIG. 2. The amination technique was originally described by VanDelinder et al. for polycarbonate, wherein a nucleophilic substitution of the carbonyl group by hexamethylenediamine (NMDA) causes polymer chain scission and formation of a terminal hexylaminocarbamate. See V. VanDelinder et al., *ACS Appl. Mater. Interfaces* 7(10), 5643 (2015). Addition of the diamine results in a polymer surface decorated with amine groups that are available for subsequent functionalization reactions, as shown in FIG. 1. A carbonyl group, either in the polymer, or introduced via polymer additives or by surface treatment, that can undergo nucleophilic substitution by the diamine is required for amination. However, in general, any polymer that can be surface functionalized can be used.

Single-walled carbon nanotubes (SWCNTs) can be non-covalently functionalized using π-stacking to irreversibly adsorb the bifunctional molecule 1-pyrenebutyric acid N-hydroxysuccinimide ester (PBA-NHS) onto the hydrophobic sidewall surfaces in an organic solvent, as described in by Chen et al. See R. J. Chen et al., *J. Am. Chem. Soc.* 123(16), 3838 (2001). The highly aromatic pyrenyl group strongly interacts with the sidewalls of the SWCNT via π-stacking. This leads to the functionalization of the SWCNTs with succinimidyl ester groups that are highly reactive to nucleophilic substitution by the amine groups that exist on the aminated polymer surface to form amide bonds. To attach the ester functionalized SWCNT to the aminated polymer surface, the aminated polymer can be washed with DI water, dried with $N_2$, and immediately immersed into a PBA-NHS/CNT in dimethylformamide (DMF) solution, thereby chemically bonding the carbon nanotubes to the polymer surface, as shown in FIG. 1. In addition to single-walled carbon nanotubes, double-walled carbon nanotubes, multi-walled carbon nanotubes, fullerenes, graphene (nanoplatelets, sheets), boron nitride (nanotubes—single, double, multi-walled), sheets, or any nanomaterial comprising a hexagonal lattice capable of π stacking interactions can be attached to the aminated polymer surface. Other pyrene-based compounds that can attach to the hexagonal-lattice containing nanomaterial can be used. The organic solvent can be any solvent capable of dispersing the π-stacking moiety for nanomaterial functionalization, such as DMF or methanol. As examples of the invention, polycarbonate (PC), high-density polyethylene (HDPE) in white (HDPE-W) and black (HDPE-B) color, and two epoxies, an EPON 828 amine curative blend (Epoxy A), EPON 828/EPONEX1510 amine curative blend (Epoxy B), were functionalized according to the amination chemistry shown in FIG. 2. Some of the aminated surfaces were further functionalized with poly(ethylene glycol) (PEG) in a PEGylation step to aid in analysis of the functionalized polymer surfaces, HDPE surfaces were probed with X-ray photoelectron spectroscopy (XPS). XPS is particularly useful as it is capable of depth analysis ca. 3-10 nanometers. The XPS data for HDPE-W are shown in FIGS. 3A-3D. As shown in FIG. 3A, the untreated samples exhibited a large peak at ~285 eV for —C—C-bonds. There was also a significant amount of C—N bonds at the binding energy of ~286 eV. Trace amount of C—O, and C═O, and COOH were also present on the surface of the untreated sample. As shown in FIG. 3B, the chemically treated sample exhibited an increase in C—N bonds as well as C—O bonds. As shown in Table 1, the XPS data indicated a decrease in C—C and C—H bonds and an increase in C—N (8.4 to 17.4% for HDPE-W, and 0 to 16.5% for HDPE-B) and C—O (2.1 to 3.8% for HDPE-W and 5.0 to 5.9% for HDPE-B) bonding at the surface after chemical treatment. The increases in C—N and C—O content indicate the successful amination followed by PEGylation of the HDPE polymer surface. The untreated HDPE surfaces could also be functionalized following surface treatment with 125 W argon or oxygen plasmas, as shown in FIGS. 3C and 3D. Table 1 also summarizes the changes in functional groups observed with these plasma treatments.

TABLE 1

XPS of treated and untreated HDPE surfaces.

| sample | C—C, C—H % | C—N % | C—O % | C═O % | COOH % |
|---|---|---|---|---|---|
| HDPE, no treatment | 85.1 | 8.4 | 2.1 | 3.3 | 1.1 |
| HDPE, chemically treated (amination + PEGylation) | 74.0 | 17.4 | 3.8 | 3.5 | 1.2 |
| HDPE, Ar plasma | 73.2 | 12.5 | 4.4 | 5.4 | 4.4 |
| HDPE, O$_2$ plasma | 80.0 | 0.0 | 10.6 | 3.3 | 6.1 |

PC exhibited chemical changes to the treated surface via XPS analysis, which confirms the success of amination (increase in C—N content and decrease in C—C), as shown in FIGS. 4A and 4B. As shown in Table 2, the XPS data indicated a drop in C—C/C—H bonding from 87.7 to 73.5% and C—O from 11.3 to 5.5% while increases in C—N (0 to 14.3%), C═O (0 to 4.0%) and COOH (0.9 to 2.7%) were observed, again indicating the successful amination followed by PEGylation of the PC polymer surface. The untreated PC surfaces could also be functionalized following surface treatment with 125 W argon or oxygen plasmas, as shown in FIGS. 4C and 4D. Table 2 also summarizes the changes in functional groups observed with these plasma treatments.

TABLE 2

XPS of treated and untreated PC surfaces.

| sample | C—C, C—H % | C—N % | C—O % | C═O % | COOH % |
|---|---|---|---|---|---|
| PC, no treatment | 87.7 | 0.0 | 11.3 | 0.0 | 0.9 |
| PC, chemically treated | 73.5 | 14.3 | 5.5 | 4.0 | 2.7 |
| PC, Ar plasma | 79.1 | 0.0 | 14.2 | 2.5 | 4.2 |
| PC, O$_2$ plasma | 72.5 | 0.0 | 17.0 | 4.3 | 6.2 |

To attach the CNTs to the aminated polymer surfaces, the CNT surfaces were first functionalized according to the method of Chen et al. Two different solutions (SWCNTs dispersed in DMF, and non-dispersed) were used for functionalization of the SWCNTs. The SWCNTs had outer diameters of 1-2 nm, inner diameters of 0.8-1.6 nm, and lengths of 5-30 μm. Both functionalizations started with a 6 mM 1-pyrenebutyric acid N-hydroxysuccinimide ester (PBA-NHS) solution in dimethylformamide (DMF).

Figure 5:
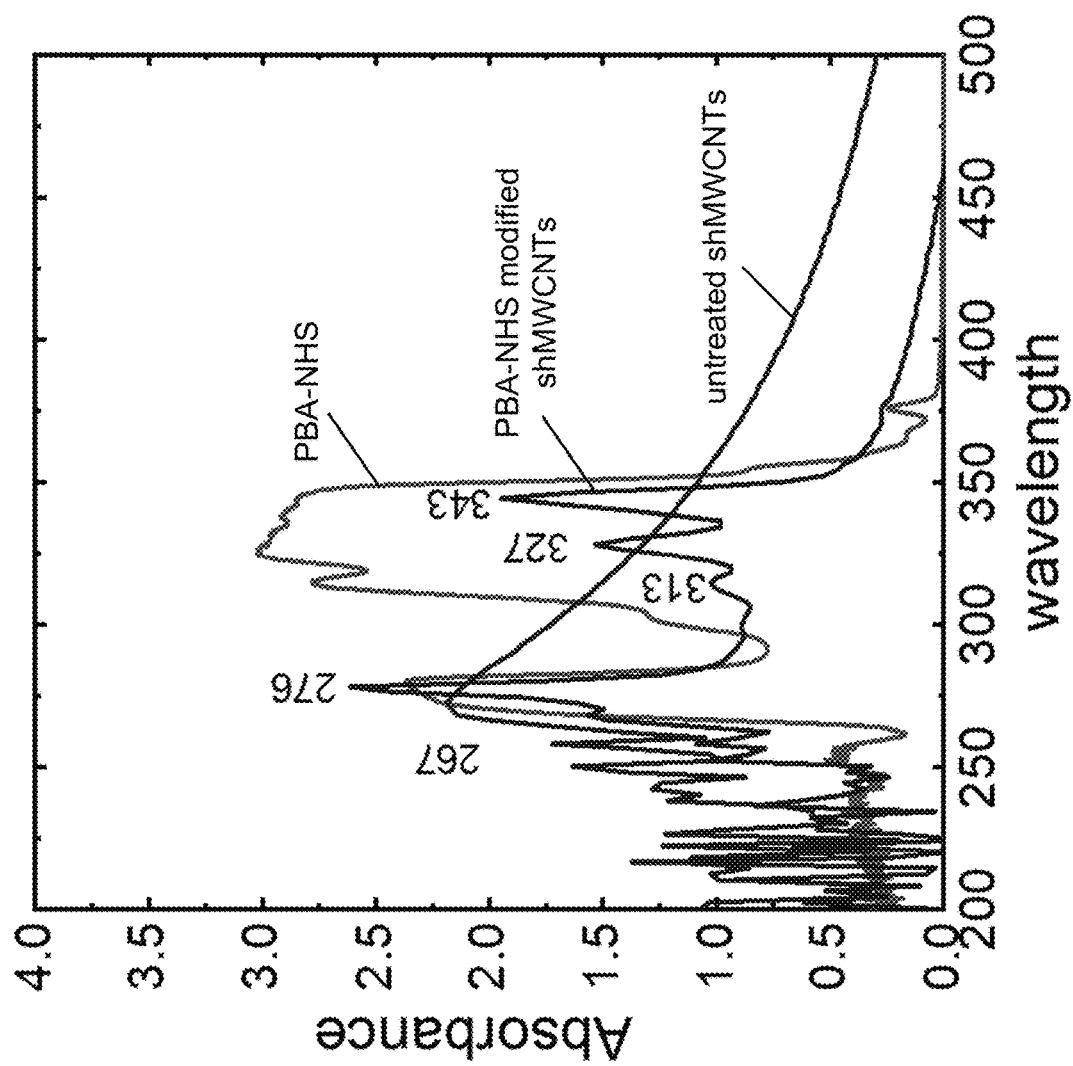
FIG. 5 shows UV-vis spectra of 1-pyrenebutyric acid N-hydroxysuccinimide ester (PBA-NHS) and PBA-NHS-modified short multi-walled carbon nanotubes (shMWCNTs).
Figure 6:
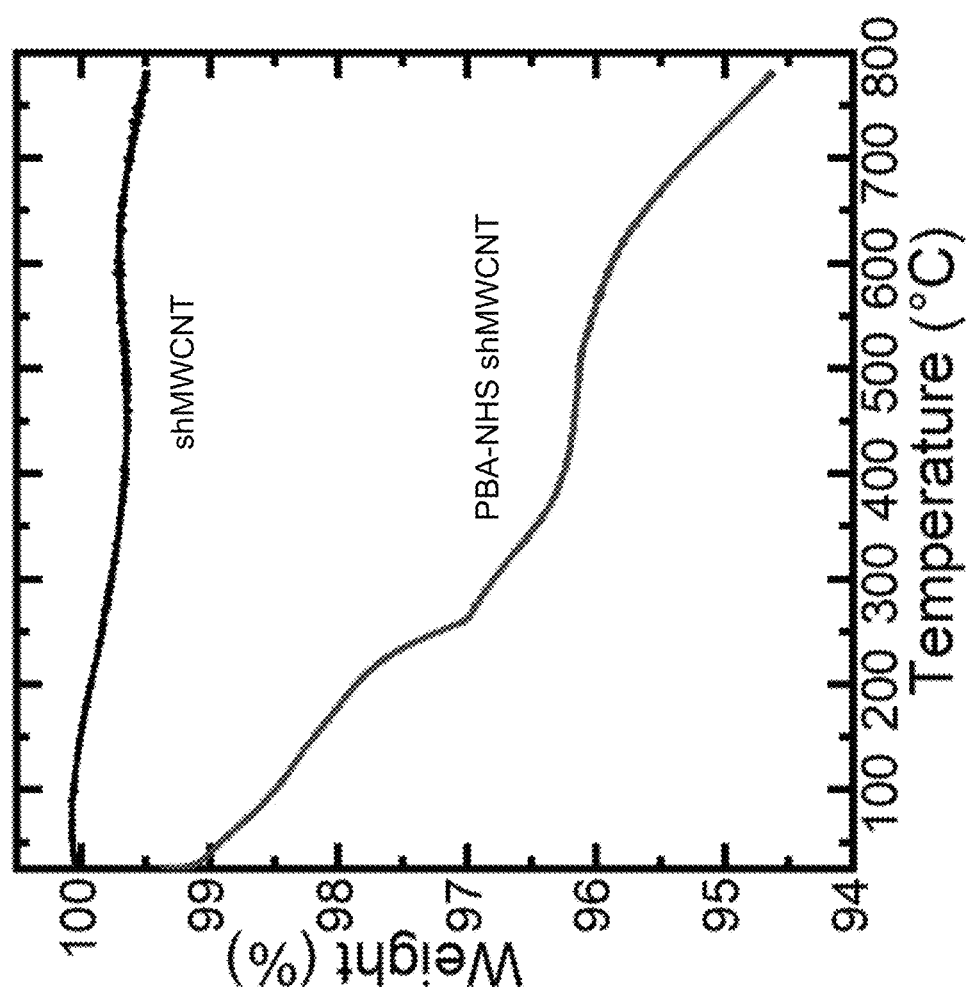
FIG. 6 is a thermographic analysis (TGA) of shMWCNTs and PBA-NHS-modified shMWCNTs, showing PBA-NHS attachment to shMWCNTs.

FIG. 5 shows UV-vis spectra of 1-pyrenebutyric acid N-hydroxysuccinimide ester (PBA-NHS) and PBA-NHS-modified short multi-walled carbon nanotubes (shMWCNT) after 5 rinses to remove non-adsorbed PBA-NHS. The former spectrum shows the strong absorbance of pyrene in three sharp bands around 330 nm, which are very sensitive to the chemical environment. The latter spectrum indicates pyrene attachment to the surface of the shMWCNTs.

FIG. 5 shows a thermogravimetric analysis (TGA) of shMWCNT with and without PBA-NHS functionalization. The former trace indicates the thermal stability of the CNTs. The latter trace demonstrates the loss of PBA-NHS attached to the CNTs.

The CNT surfaces were probed by XPS before and after treatment with PBA-NHS. Table 3 summarizes the changes in elemental composition and Table 4 summarizes the changes in chemical bonding for CNTs before and after PBA-NHS functionalization.

TABLE 3

Elemental composition of carbon nanotubes before and after PBA-NHS treatment determined by XPS.

| Sample | C 1s % | N 1s % | O 1s % |
|---|---|---|---|
| Untreated CNT | 98.68 | 0.00 | 1.32 |
| Treated CNT | 97.35 | 0.36 | 1.83 |

TABLE 4

Summary of XPS high resolution scans of the carbon, nitrogen, and oxygen spectra for carbon nanotubes before and after PBA-NHS treatment, from.

| Sample | C—C % | C—O % | C=O % | CN % | CO3 % |
|---|---|---|---|---|---|
| Untreated CNT | 47.65 | 31.59 | 4.46 | 6.22 | 10.07 |
| Treated CNT | 54.67 | 24.49 | 4.47 | 6.99 | 9.39 |

| Sample | C—NH3 % | (NH2)2 % | NH4+/N2O % | O—C=O—N % |
|---|---|---|---|---|
| Untreated CNT | 22.71 | 77.29 | 0.00 | 0.00 |
| Treated CNT | 81.20 | 4.96 | 13.84 | 0.00 |

| Sample | O—C=O—O % | O—N2 % | O—Si/C—O % | OH % |
|---|---|---|---|---|
| Untreated CNT | 9.33 | 6.39 | 54.40 | 29.88 |
| Treated CNT | 29.77 | 4.26 | 37.81 | 28.17 |

For the dispersed solution, a 1 wt. % CNT dispersion in DMF was added to the PBA-NHS/DMF solution in approximately equal weight amounts. Surface-aminated polymers PC and Epoxy B were added to the dispersed CNT/PBA-NHS/DMF solution (aminated polymer surface face down in solution) for three hours. Approximately 2 mL of a 100 mM aqueous solution of sodium bicarbonate (pH ca. 8) was added to facilitate the reaction. The samples were then placed in a vacuum oven at 65° C. for two hours to remove DMF. Epoxy B was dried overnight but still had some residual DMF. Therefore, an exchange of DMF with methanol was carried out by submerging the sample in MeOH overnight. The sample was then dried under vacuum at 65° C. Contact angle measurements of the polymer surfaces showed a decrease for Epoxy B after CNT attachment, from 114.8 degrees to 54.2 degrees, but no appreciable change for the PC surface.

Figures 7A, 7B, 7C, 7D, 7E, 7F:
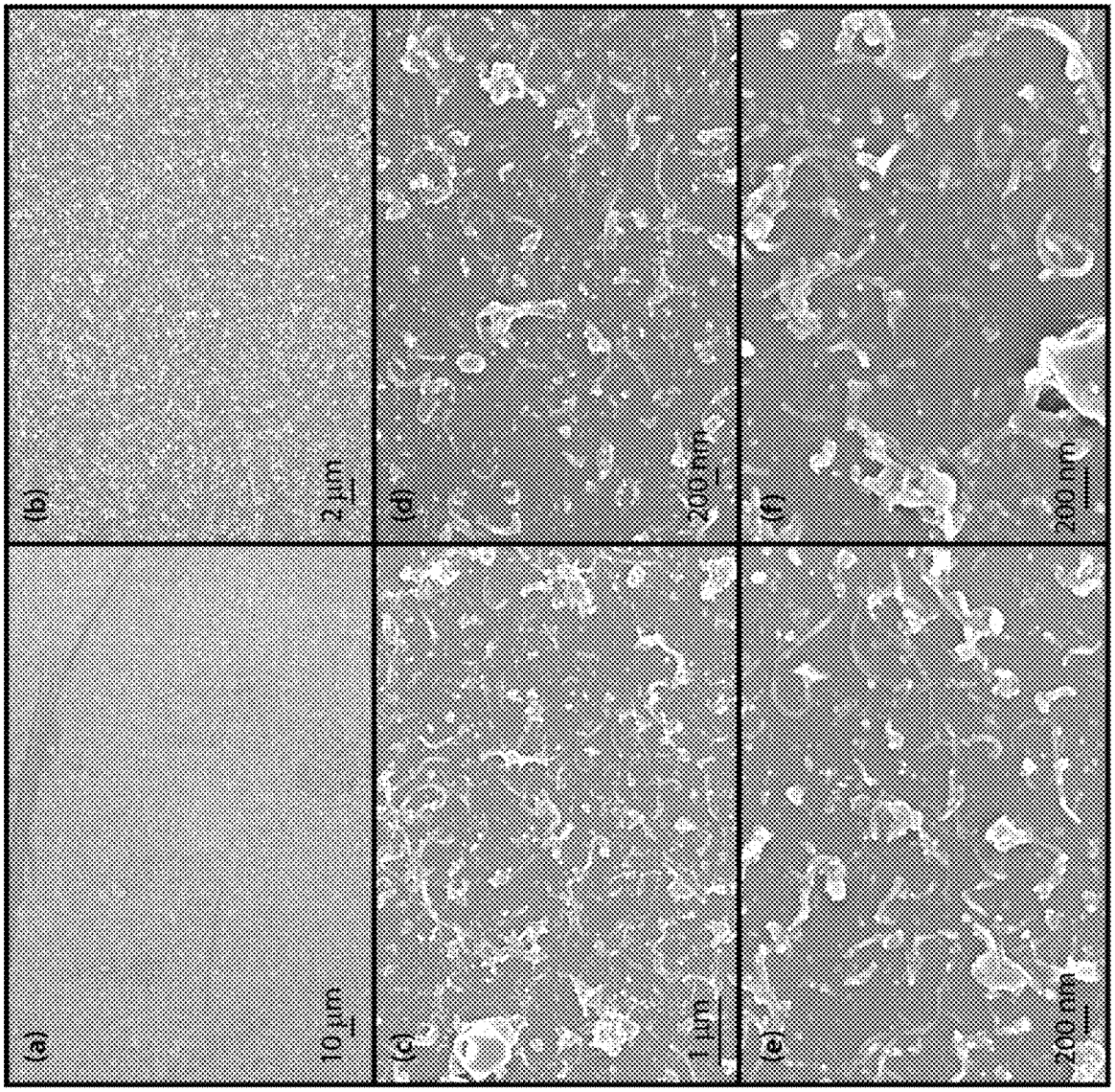
FIGS. 7A-7F show scanning electron microscopy (SEM) images of Epoxy A after CNT attachment. Images increase in magnification from FIG. 7A to FIG. 7F. Note there are varying sizes of CNT clusters all over the sample surface.

For the non-dispersed solution, non-dispersed CNTs were added at 1 wt. % to the PBA-NHS/DMF solution. Surface-aminated Epoxy A was placed in the non-dispersed CNT/PBA-NHS/DMF solution with approximately 2 mL of 100 mM aqueous solutions of sodium bicarbonate (pH ca. 8) for 10 days. Examination of the Epoxy A sample with scanning electron microscopy (SEM) revealed clusters of CNTs attached the polymer surface, as shown in FIG. 7. These surfaces underwent washing, solvent exchange, and vacuum drying, indicating that the nanotubes were chemically adhered to the surface.

The epoxy surfaces were probed by XPS before and after amination and CNT attachment. Table 5 summarizes the changes in elemental composition and Table 6 summarizes the changes in chemical bonding of epoxy before and after amination treatment and after the addition of CNTs.

TABLE 5

Elemental composition of epoxy before and after amination and after carbon nanotube attachment determined using XPS.

| Sample | C 1s % | N 1s % | O 1s % |
|---|---|---|---|
| Epoxy | 80.15 | 1.28 | 13.72 |
| NH2 Epoxy | 74.47 | 1.91 | 16.31 |
| Nanotubes Epoxy | 63.31 | 1.31 | 19.97 |

TABLE 6

Summary of XPS high resolution scans of carbon, oxygen, and nitrogen spectra for epoxy before and after amination and after carbon nanotube attachment.

| Sample | C—C % | C—O % | C=O % | CN % | CO3 % |
|---|---|---|---|---|---|
| Epoxy | 47.97 | 40.39 | 3.40 | 8.12 | 0.12 |
| NH2 epoxy | 56.97 | 32.14 | 0.89 | 9.79 | 0.12 |
| Nanotubes Epoxy | 52.82 | 33.93 | 1.28 | 11.97 | 0.00 |

| Sample | O—C=O—O % | O—N2 % | O—Si % | OH % |
|---|---|---|---|---|
| Epoxy | 50.46 | 0.23 | 30.48 | 18.83 |
| NH2 Epoxy | 68.55 | 0.31 | 20.25 | 10.89 |
| Nanotubes Epoxy | 51.26 | 1.29 | 33.19 | 14.26 |

| Sample | C—NH3 % | (NH2)2 % | NH4+ % | O—C=O—N % |
|---|---|---|---|---|
| Epoxy | 14.29 | 62.35 | 5.76 | 17.60 |
| NH2 Epoxy | 25.18 | 50.56 | 11.42 | 12.84 |
| Nanotubes Epoxy | 27.09 | 43.69 | 12.91 | 16.32 |

Figure 8:
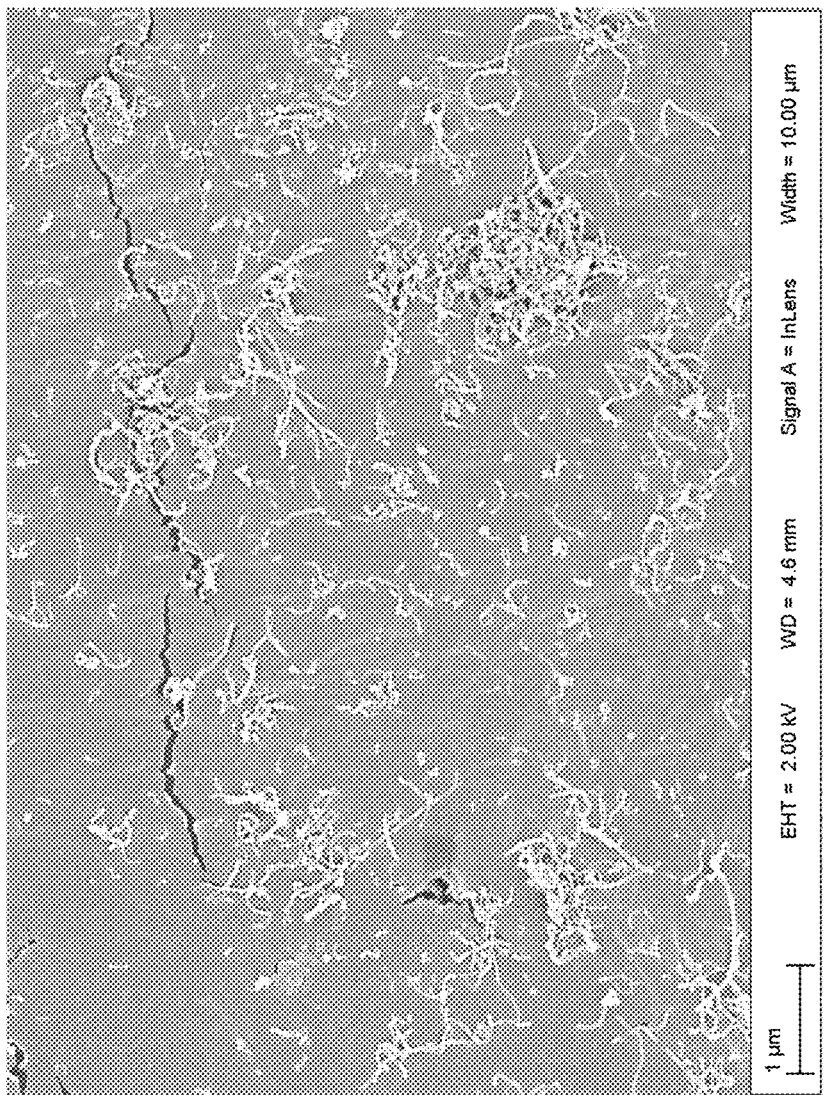
FIG. 8 is an SEM image of HDPE after shMWCNT attachment.

CNTs were also attached to HDPE surfaces using procedures similar to those described for those described above for the epoxies. The HDPE surfaces were probed by XPS before and after amination and CNT attachment. Table 7 summarizes the changes in elemental composition and Table 8 summarizes the changes in chemical bonding of HDPE before and after amination and after the addition of CNTs. FIG. 8 is an SEM image of HDPE after shMWCNT attachment.

TABLE 7

Elemental composition of HDPE before and after amination and after carbon nanotube attachment determined using XPS.

| Sample | C 1s % | N 1s % | O 1s % |
|---|---|---|---|
| HDPE | 91.01 | 0.21 | 5.61 |
| NH2 HDPE | 85.01 | 1.83 | 8.26 |
| Nanotubes HDPE | 84.90 | 0.64 | 8.28 |

TABLE 8

Summary of XPS high resolution scans of carbon, oxygen, and nitrogen spectra for HDPE before and after amination and after carbon nanotube attachment.

| Sample | C—C % | C—O % | C=O % | CN % | CO3 % |
|---|---|---|---|---|---|
| HDPE | 81.19 | 14.79 | 2.42 | 1.46 | 0.14 |
| NH2 HDPE | 62.75 | 31.07 | 1.83 | 4.31 | 0.04 |
| Nanotubes HDPE | 74.23 | 20.81 | 1.48 | 3.41 | 0.07 |

| Sample | O—C=O—O % | O—N2 % | O—Si % | OH % |
|---|---|---|---|---|
| HDPE | 33.13 | 0.41 | 10.64 | 55.82 |
| NH2 HDPE | 51.54 | 0.48 | 10.03 | 37.94 |
| Nanotubes HDPE | 49.07 | 2.44 | 14.74 | 33.75 |

| Sample | C—NH3 % | (NH2)2 % | NH4+ % | O—C=O—N % |
|---|---|---|---|---|
| HDPE | 6.51 | 70.93 | 14.31 | 8.26 |
| NH2 HDPE | 28.61 | 57.91 | 12.01 | 1.48 |
| Nanotubes HDPE | 19.62 | 61.06 | 16.41 | 2.91 |

The present invention has been described as a method for chemically attaching carbon nanotubes to a polymer surface. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A method for chemically attaching nanomaterial comprising a hexagonal lattice to a polymer surface, comprising:
   aminating the polymer surface with amine groups,
   functionalizing the surfaces of the nanomaterial with ester groups, and
   reacting the ester groups on the functionalized nanomaterial surfaces with the amine groups on the aminated polymer surface in an organic solution to form an amide bond, thereby chemically attaching the nanomaterial to the polymer surface.

2. The method of claim 1, wherein the polymer comprises polycarbonate, polyethylene, or epoxy.

3. The method of claim 1, wherein the nanomaterial comprises a hexagonal lattice capable of π stacking.

4. The method of claim 1, wherein the organic solvent is capable of dispersing a π-stacking moiety for functionalization of the nanomaterial.

5. The method of claim 1, wherein the animating step comprises reacting the polymer surface with hexamethylenediamine to form primary amine groups on the polymer surface.

6. The method of claim 1, wherein the functionalizing step comprises reacting the nanomaterial surfaces with 1-pyrenebutyric acid N-hydroxysuccinimide ester to attach the pyrenyl group to the nanomaterial surface via π-stacking and functionalizing the surface with succinimidyl ester groups.

7. The method of claim 1, wherein the reacting step comprises immersing the aminated polymer surface in a solution comprising the nanomaterial in a 1-pyrenebutyric acid N-hydroxysuccinimide ester in dimethylformamide solution.

8. The method of claim 3, wherein the nanomaterial comprises a single-walled carbon nanotube, double-walled carbon nanotube, multi-walled carbon nanotube, fullerene, graphene, or boron nitride nanotube.

9. The method of claim 4, wherein the organic solvent comprises dimethylformamide or methanol.

\* \* \* \* \*